(12) United States Patent
Gerwolls et al.

(10) Patent No.: US 8,465,087 B2
(45) Date of Patent: Jun. 18, 2013

(54) ENERGY ABSORBER WITH ANTI-SQUEAK ANTI-RATTLE FEATURE

(75) Inventors: Matthew M. Gerwolls, Royal Oak, MI (US); Michael A. Rossi, Grosse Ile, MI (US); Dane Winbigler, Harper Woods, MI (US); Donald S. Smith, Commerce, MI (US); Joel M. Cormier, Lathrup Village, MI (US); Richard F. Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 537 days.

(21) Appl. No.: 12/729,480

(22) Filed: Mar. 23, 2010

(65) Prior Publication Data

US 2010/0244469 A1     Sep. 30, 2010

Related U.S. Application Data

(60) Provisional application No. 61/164,700, filed on Mar. 30, 2009.

(51) Int. Cl.
 *B60R 21/02* (2006.01)
(52) U.S. Cl.
 USPC ...... 296/187.05; 280/752; 188/377; 206/521; 296/146.7; 296/214
(58) Field of Classification Search
 USPC ............. 296/214, 39.3, 187.05, 39.1, 1.08, 296/146.7; 280/748, 751, 752; 188/371, 376, 188/377; 206/521–594
 See application file for complete search history.

(56) References Cited

U.S. PATENT DOCUMENTS

| | | | | | |
|---|---|---|---|---|---|
| 2,225,067 | A | * | 12/1940 | Marin | 16/86 A |
| 3,980,221 | A | * | 9/1976 | Okada | 206/586 |
| 4,696,401 | A | * | 9/1987 | Wallace | 206/594 |
| 5,744,763 | A | * | 4/1998 | Iwasa et al. | 181/286 |
| 6,017,084 | A | | 1/2000 | Carroll, III et al. | |
| 6,199,942 | B1 | | 3/2001 | Carroll, III et al. | |
| 6,221,292 | B1 | | 4/2001 | Carroll, III | |
| 6,247,745 | B1 | | 6/2001 | Carroll, III et al. | |
| 6,318,755 | B1 | * | 11/2001 | Nusser et al. | 280/752 |
| 6,679,967 | B1 | | 1/2004 | Carroll, III et al. | |
| 6,682,128 | B2 | | 1/2004 | Carroll, III et al. | |
| 6,752,450 | B2 | | 6/2004 | Carroll, III et al. | |
| 7,360,822 | B2 | | 4/2008 | Carroll, III et al. | |
| 7,377,577 | B2 | | 5/2008 | Carroll, III et al. | |
| 7,384,095 | B2 | | 6/2008 | Cormier et al. | |
| 7,404,593 | B2 | | 7/2008 | Cormier et al. | |

FOREIGN PATENT DOCUMENTS

DE     4336665     *   5/1995

* cited by examiner

*Primary Examiner* — Dennis Pedder
(74) *Attorney, Agent, or Firm* — Brooks Kushman P.C.

(57) ABSTRACT

An energy absorber includes a base sheet and a plurality of crush lobes extending from the base sheet. Each crush lobe includes a side wall oriented to crush and collapse to absorb energy when impacted in a first direction and includes an end wall. At least one of the base sheet and the end wall of at least one crush lobe includes an integrally-formed protruding countermeasure of lower standing strength than the crush lobes so that the protruding countermeasure acts to dampen movement causing buzzes, squeaks and/or rattles between the end wall and an adjacent structure. The countermeasure can be integrally formed or an insert, such as a magnet or other insert. Methods related to the above are also described.

10 Claims, 5 Drawing Sheets

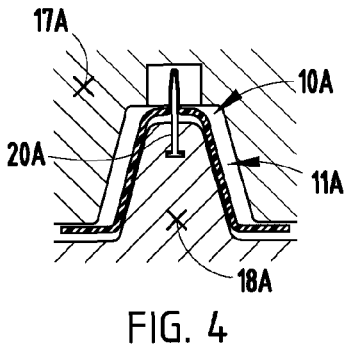
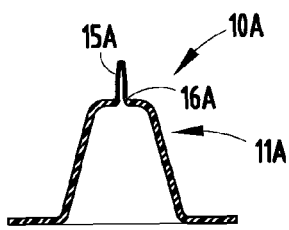
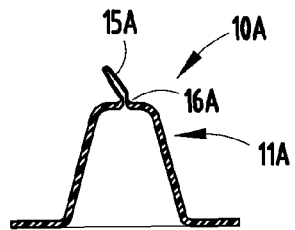
FIG. 4          FIG. 5          FIG. 6
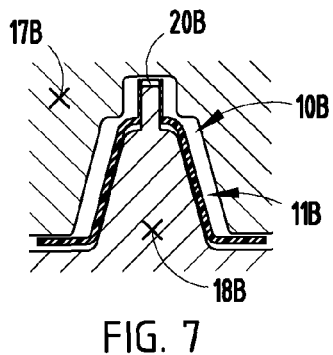
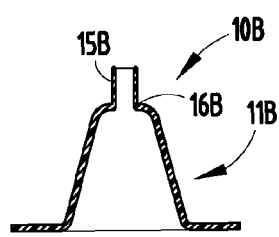
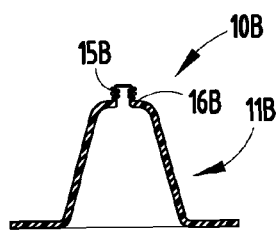
FIG. 7          FIG. 8          FIG. 9
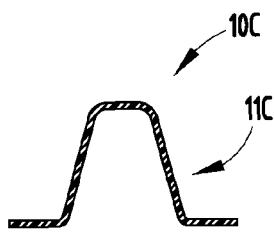
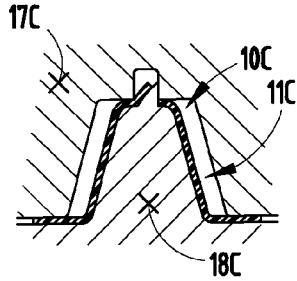
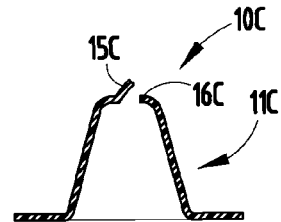
FIG. 10         FIG. 11         FIG. 12
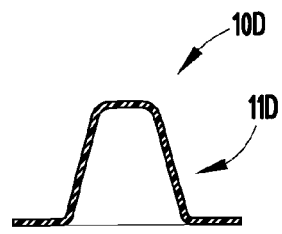
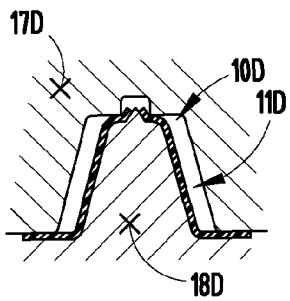
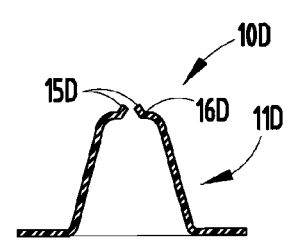
FIG. 13         FIG. 14         FIG. 15

US 8,465,087 B2

ENERGY ABSORBER WITH ANTI-SQUEAK ANTI-RATTLE FEATURE

This application claims benefit under 35 U.S.C. §119(e) from provisional application Ser. No. 61/164,700, filed Mar. 30, 2009, entitled ENERGY ABSORBER WITH ANTI-SQUEAK ANTI-RATTLE FEATURE, the entire contents of which are incorporated herein in their entirety.

BACKGROUND

The present invention relates to energy absorbers, such as are used for absorbing energy in passenger vehicles. However, the present disclosure is not believed to be limited to only passenger vehicles.

Many different geometrically shaped thermoformed energy absorbers are known, such as those shown and described in U.S. Pat. Nos. 6,017,084; 6,221,292; 6199,942; 6,247,745; 6,679,967; 6,682,128; 6,752,450; 7,360,822; 7,377,577; 7,384,095; 7,404,593; 7,625,024; 7,628,444; and 7,625,036. These shapes have proven to provide dynamic force versus deflection curves that produce a relatively "square wave" shape when comparing their force properties as a function of deflection. Often, these formed energy absorbers lie between a Class-A surface (such as a bumper fascia, a headliner, or a door trim panel) and a rigid sheet metal structure in automotive applications. The energy absorber is typically designed with a 3-5 mm gap to one surface and attached to another. However, in some instances it becomes necessary to increase the overall depth of the energy absorber such that the unattached surface is closer to the other surface during normal vehicle operation. Further, product variation may cause some areas to become closer than the optimal gap distance. When the energy absorber lightly contacts the opposing surface, such as due to movement and inertia of the vehicle and relative components of the vehicle, a buzz, rattle, or squeak can be heard, which customers object to or find annoying. This noise occurs because the flat hard plastic surface can tap or slide against the opposing structure.

Materials are sometimes added to or placed adjacent energy absorbers in an effort to solve this problem. For example, in the past, a fabric pad, flock material, foam padding, or other kinds of flexible material have been added to one of the surfaces responsible for making the noise in an effort to lessen or eliminate the severity of the buzzing or tapping, and/or to eliminate the possibility of one surface translating into the other (or translating across the other causing a squeak). However, this requires the purchase and assembly of a separate component, causing added complexity, cost, and mass.

SUMMARY OF THE PRESENT INVENTION

In one aspect of the present invention, an energy absorber includes a base sheet and a plurality of crush lobes extending from the base sheet. Each crush lobe includes a side wall oriented to crush and collapse to absorb energy when impacted in a first direction and includes an end wall. At least one of the base sheet and the end wall of at least one crush lobe includes an integrally-formed protruding countermeasure of lower standing strength than the crush lobes so that the protruding countermeasure acts to dampen movement causing buzzes, squeaks and/or rattles between the end wall and an adjacent structure.

Another object is to provide a BSR countermeasure that does not add to a weight of a final assembly.

Another object is to provide a BSR countermeasure that does not significantly affect the energy absorbing characteristics of the absorber itself.

In another aspect of the present invention, an energy absorber includes a base sheet and a plurality of crush lobes extending from the base sheet, each crush lobe including a side wall oriented to crush and collapse to absorb energy when impacted in a first direction and including an end wall, the end wall including an integrally-formed countermeasure of lower standing strength than the crush lobes, the countermeasure extending in a direction away from the crush lobe, so that the countermeasure acts to dampen movement that would otherwise cause buzzes, squeaks and/or rattles between the energy absorber and an adjacent structure.

In another aspect of the present invention, a method includes steps of forming energy absorber with a base sheet and crush lobes extending from the base sheet a height dimension, and forming an integral countermeasure of weaker standing strength than the crush lobes and that extends outside of the height dimension.

In another aspect of the present invention, a thermoformed component thermoformed from a sheet of heated polymeric material is provided for taking up space between two assembled components defining a cavity therebetween, the cavity having a thickness direction and elongated directions generally orthogonal to the thickness direction. The thermoformed component includes a base sheet and a plurality of thermoformed structures extending from the base sheet, each thermoformed structure including a side wall extending generally in the thickness direction and including at least one wall extending generally in the orthogonal directions and including an end wall, the end wall including an integrally-formed countermeasure of lower standing strength than the thermoformed structures, the countermeasure extending in a direction generally along the thickness direction and away from the thermoformed structures, so that the countermeasure acts to dampen movement that would otherwise cause buzzes, squeaks and/or rattles between the thermoformed component and one of the two assembled components.

In another aspect of the present invention, a method includes steps of providing a component, forming an energy absorber including crush lobes and at least one countermeasure in an end of one of the crush lobes, the countermeasure being configured to one or engage or attract the component when placed adjacently, so that buzzes, squeaks, and rattles caused by movement of the energy absorber relative to the adjacent part are eliminated, and assembling the energy absorber and the component in adjacent positions relative to each other with the countermeasure preventing movement that would cause a buzz, squeak, or rattle.

In still another aspect of the present invention, a thermoforming apparatus includes a heater for heating a flat sheet of polymeric material, at least one thermoforming die for forming the flat sheet into a three-dimensional energy absorber with a base sheet and a plurality of crush lobes, and tooling for forming a BSR countermeasure in at least one of the base sheet and the crush lobes.

These and other aspects, objects, and features of the present invention will be understood and appreciated by those skilled in the art upon studying the following specification, claims, and appended drawings.

BRIEF DESCRIPTION OF DRAWINGS

FIGS. 4-6 and FIGS. 7-9 are cross-sectional views of modified energy absorbers; FIGS. 4-6 and FIGS. 7-9 being similar to FIGS. 1-3, respectively, but having the BSR countermeasures formed on a top end of the crush lobes.

FIGS. 10-12 are cross-sectional views of a thermoformed energy absorber with crush lobe(s), FIG. 10 showing the energy absorber as initially thermoformed, FIG. 11 showing a secondary punch (or downstream-positioned punch tool in a thermoform line), and FIG. 12 showing the energy absorber of FIG. 10 but including the integral BSR countermeasure.

FIGS. 13-15 are cross-sectional views of a modified energy absorber similar to FIGS. 10-12, but with an alternatively-shaped BSR countermeasure.

DETAILED DESCRIPTION OF PREFERRED EMBODIMENTS

As illustrated by the several variations shown in the attached figures and in the discussion below, it is contemplated that a "soft" countermeasure structure (called "BSR countermeasure" herein) can be formed integrally, or trimmed into, or attached to the existing material of an energy absorber at the location(s) of a potential buzz, squeak, or rattle (called "BSR noises") during the part's normal manufacturing process. The BSR countermeasure has a relatively lower longitudinal/standing strength than the crush lobe it is associated with. By doing so, it acts as a dampener, thus greatly reducing the likelihood of significant buzz, squeak, and/or rattle noises in the final assembled product (i.e., in this case, passenger vehicle). Further, a significant assembly cost reduction and mass reduction can be realized with only a minimal increase in the tooling and/or part manufacturing cost. Notably, headliner constructions are shown below. However, persons skilled in this art will understand that the present disclosure is not limited to only headliners, but instead can be applied to many other applications, including but not limited to other locations in a vehicle passenger compartment (e.g., doors, instrument panels, trim components for A, B and C pillars and roof supporting structures of vehicles, and other components).

Figure 1:
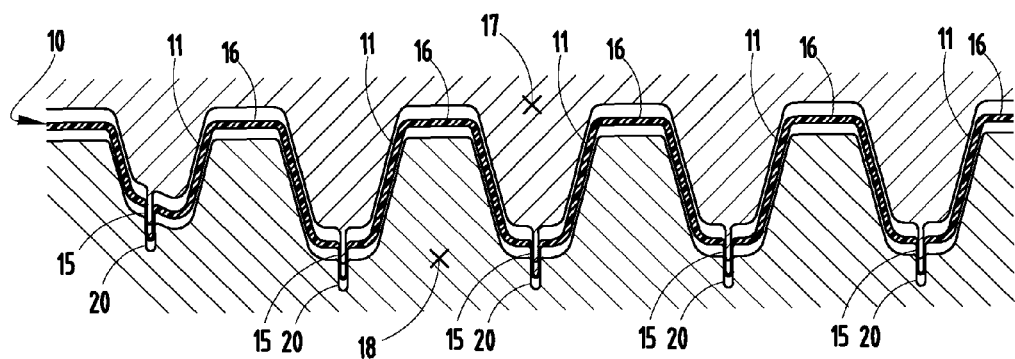
FIG. 1 is a cross-sectional view of opposing thermoforming dies forming a sheet into a energy absorber with a plurality of protruding crush lobes and each having an integral countermeasure on their base sheet for reducing buzzes, squeaks, and rattles (BSR) upon installation.

The illustrated energy absorber 10 (FIGS. 1-3) includes a matrix of hollow (cup-shaped or flat-sided pyramid-shaped) three-dimensional crush lobes 11 extending from a base sheet 12, each having a BSR countermeasure 15 on them. It is noted that the crush boxes can be arranged in any pattern desired, such as an orthogonal or diagonal matrix of parallel rows and columns that would partially or totally cover the area of a vehicle roof from side-to-side and from front-to-rear of a vehicle's passenger compartment. Further, the crush lobes 11 can be similar to each other or can be varied, so as to have different widths, heights, and/or cross-sectional shapes (parallel or perpendicular to the base sheet). Further, the crush lobes 11 can have uniform or non-uniform spacing and/or different lateral relationships and/or be varied to match roof and mating structures as needed for energy absorption in different areas of the part. For example, the energy absorber 10 can have different regions, some regions of which have crush lobes arranged or configured a first way, and other regions of which have crush lobes arranged or configured a second different way, which is often the situation in energy absorbers used in vehicle roof structures, as will be understood by persons skilled in this art.

Figure 2:
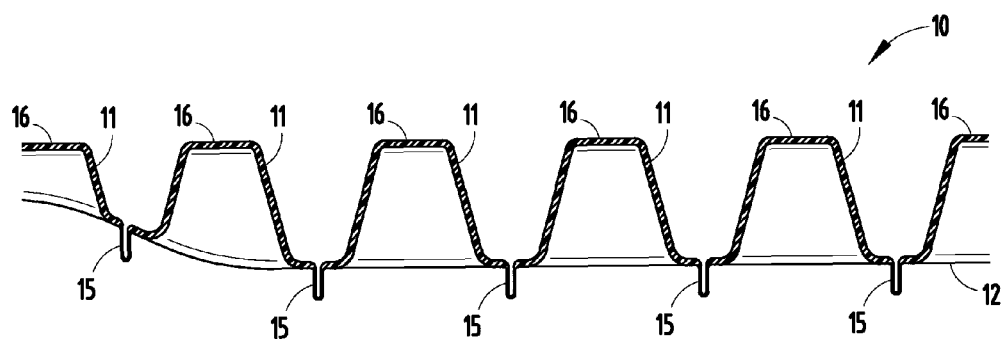
FIG. 2 is a cross-sectional view showing the thermoformed energy absorber of FIG. 1.
Figure 3:
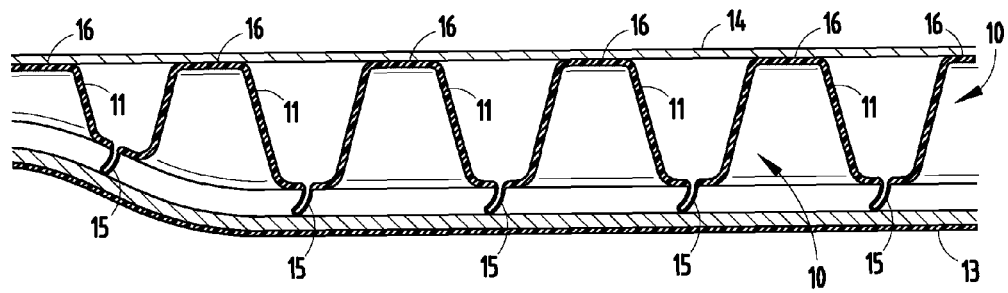
FIG. 3 is a cross-sectional view showing the energy absorber in an installed position in a roof structure of a passenger vehicle.

The illustrated energy absorber 10 is thermoformed to a three-dimensional shape from a heated flat sheet of polymeric material by opposing forming dies 17 and 18 (see FIG. 1), and then cooled to form a three-dimensional functional component (see FIG. 2). Opposing forming dies 17 and 18 are illustrated, but it is contemplated that the present inventive concepts can be used in other forming processes, such as a thermoforming process using only a single sided die (such as vacuum thermoforming). Also, the present inventive concepts can be used in other forming processes, such as in injection molding, compression molding, and the like.

Once formed, the illustrated energy absorber 10 is adapted to fit between and generally match a gap between a vehicle headliner 13 and its roof 14 (see FIG. 3), with the crush lobes 11 and the base sheet 12 being generally configured to take up the space between the headliner 13 and roof 14, and with outer ends 16 (also called "end walls" herein) of the crush lobes 11 and the base sheet 12 generally matching the contoured mating surfaces on the headliner 13 and roof 14. It is noted that the illustrated energy absorber 10 has differently shaped crush lobes 11 configured to meet aesthetics while also optimizing absorption of energy and distribution of impact loads in order to reduce passenger head injury (such as during a vehicle crash or roll-over accident).

As noted above, the illustrated energy absorber 10 further includes a buzz, squeak, rattle (BSR) countermeasure 15 (also called "soft structures" herein) integrally formed into its base sheet 12 (or into one or more outer ends 16 of the crush lobes 11, as illustrated below). The countermeasures 15 have a lower standing strength than the crush lobes 11, such that their "softness" acts to substantially eliminate the potential for buzz, squeak, and rattle (BSR) noises caused by repeated noise-generating vibration and/or cyclical movement of the energy absorber 10 against adjacent rigid surfaces on the headliner 13 and roof 14. It is noted that vehicle manufacturers spend considerable time and effort to eliminate BSR noises because they can be very irritating and annoying to vehicle drivers and passengers, particularly when the BSR noises come from a location close to a passenger's head, and/or any component in the vehicle's passenger compartment, especially when the noises are created near or amplified by components forming an echo chamber.

The illustrated BSR countermeasure 15 (FIG. 1) is formed by pins 20 that protrude from the top die 17 into a mating pocket in the lower die 18. (See also the other embodiments, such as FIG. 4A.) It is noted that the pins 20 can be relatively sharply pointed, since the sheet of heated thermoplastic material stock is so hot that it is very difficult to poke a hole through the sheet even with a sharp point. However, it is contemplated that the tool can include a frustoconically-shaped shaft of decreasing diameter and a rounded tip so that they do not pierce the sheet if it is needed so that the pins do not stretch and tear the sheet material when forming the finger-like thin-walled hollow elongated BSR countermeasure 15. For example, the countermeasures 15 can define a very narrow hollow finger whose size, shape, and length that is basically about the same as a thumbtack shaft protruding from a surface. The illustrated BSR countermeasures 15 are sufficient in length and strength to maintain their general elongated shape after the material of base sheet 12 is cooled (see FIG. 2), but the BSR countermeasures 15 have relatively low beam strengths such that they are easily bent over when engaged (see FIG. 3). In particular, it is noted that a length of the BSR countermeasures 15 in combination with crush lobes 11 is greater than any expected gap between the headliner 13 and the roof 14, such that the BSR countermeasure 15 contacts the headliner 13 (or roof 14) and is bent over during assembly into the vehicle. The BSR countermeasure 11 also compensates for variation in the gap due to part tolerance variation, assembly stack-up variations, and other process and part variables leading to inconsistent gaps. This results in the BSR countermeasures 15 acting to dampen any cyclical or vibratory movement of the energy absorber 10, which in turn eliminates most BSR noises. For example, it is contemplated that the BSR countermeasures 15 can be about ⅛ to ½ inch long (or more typically about ¼ to ⅜ inch long), and at their base about 1/32 to ¼ inch in diameter (or more preferably about 1/16 to ⅛ inch in diameter).

For discussion purposes, the following additional embodiments, features, and characteristics are identified by using the same numbers but with an additional letter "A", "B", "C", and etc.

The energy absorber 10A (FIGS. 4-6) is similar to energy absorber 10 (FIGS. 1-3), except that in the crush lobe 11A of energy absorber 10A (FIGS. 4-6), the BSR countermeasure 15A is formed in an outer flat tip of the crush lobe 11A by the dies 17A and 18A, while in energy absorber 10 the BSR countermeasure 15 was formed in the base sheet 12 (FIG. 2) by the dies 17 and 18. Notably, a flexibility or stiffness of the end wall 16A can affect the dampening characteristics of the BSR countermeasure 15. Specifically, the end wall 16A can provide a trampoline effect where the end wall 16A moves and resiliently flexes some limited amount when pressure is applied to the BSR countermeasure 15.

Figure 4A:
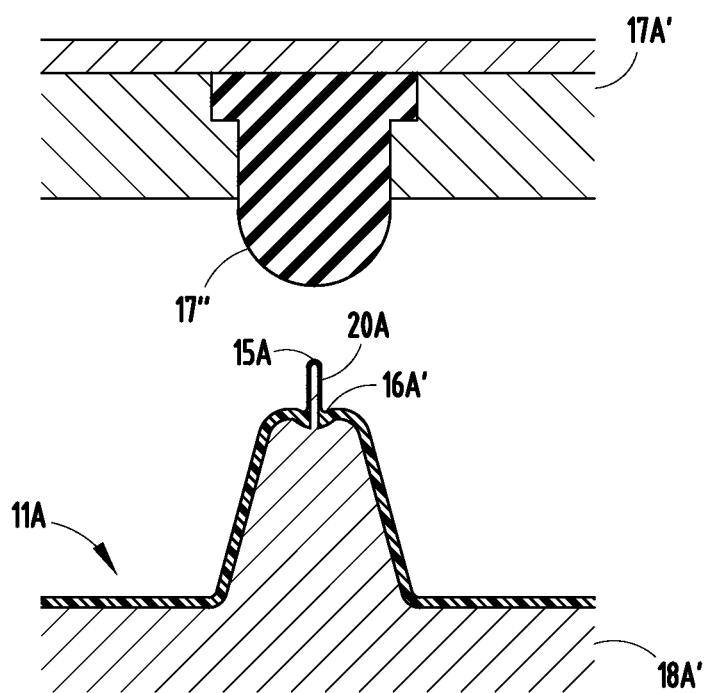
FIG. 4A is similar to FIG. 4, but of a modified tool.

FIG. 4A illustrates modified dies 17A' and 18A' for making the energy absorber 11A. The die 17A' includes a rubber grommet/plug 17A" of high temperature resistant rubber material (such as high density silicone rubber). The male tool 18A' includes a pin 20A extends into the rubber plug 17A" during the thermoforming process, which helps to extrude the material down the pin 20A and aid in thinning Notably, the rubber plug 17A" results in a shoulder 16A' around a bottom of the countermeasure 15A. A flexibility or stiffness in the shoulder 16A' results in different dampening characteristics of the countermeasure 15A. Notably, a more flexible shoulder 16A' results in a trampoline effect that can assist with noise reduction from buzzes, squeaks, and rattles. The illustrated plug 17A" has a larger rear section that fits into a mating recess in the upper tool 17A', and a smaller leading section that is rounded (or tapered or otherwise shaped) to provide a desired compression when the tool 18A' is closed against the tool 17A'. A shape of the illustrated plug 17A" allows the plug to be inserted from a top (or "back") side of the tool 17A', thus facilitating their replacement when they wear out.

It is noted that the shoulder 16A' has a "divot" or thickened section of material. This thickened section is a pool of the material that has been wiped from the pin 20A when the dies 17A' and 18A" separate. The thicker the base material stock is in the original sheet being thermoformed, the larger the amount of material wiped from the pin 20A. Initial testing has shown that this thickened shoulder 16A' of material may be important to reduce potential build variations when dealing with very thin material of the BSR countermeasure and the very small gaps in the sheet metal of the components defining the gap where the energy absorber 10A is positioned.

The energy absorber 10B (FIGS. 7-9) is similar to energy absorber 10A since its BSR countermeasures 15B are formed on outer ends of the crush lobes 11B. However, the BSR countermeasures 15B are sleeve-like and have a uniform diameter along their length and an open (or very thin) outer end. Due to a thinness of the sleeve-like BSR countermeasures 15B, they have a relatively low columnar strength and low bending strength, causing them to fold in an accordion-like manner or to distort in a lateral direction. Nonetheless, their strength is sufficient to provide dampening similar to BSR countermeasures 15 and 15A. It is noted that a particular energy absorber can include a variety of different shapes/sizes/locations of the BSR countermeasures. For example, a particular energy absorber could have one or more of each of the BSR countermeasures 15, 15A, or 15B (or any of the following BSR countermeasures). In other words, not every single crush lobe may require a BSR countermeasure.

The FIGS. 10-25 illustrate additional embodiments of interest, where a section of the energy absorber that comes into contact with the mating component is cleaved and then pushed up (or down) to create a flexible member whose surface area is relatively small and with low bending strength. For example, this can be done during molding or in secondary tooling at a location after the energy absorber with crush lobes is formed. In crush lobe 11C (FIGS. 10-12), the BSR countermeasure 15C is formed by a section of material cleaved by tooling 17C and 18C on one side from end 16C such that the BSR countermeasure 15C extends at an angle to the end 16C. The BSR countermeasure 15C has a similar thickness to the end 16C. The crush lobe 11D (FIGS. 13-15) is similar to crush lobe 11C, except BSR countermeasure 15D is formed by a section of material cleaved so that the BSR countermeasure 15D extends from both sides of end 16D toward a common (center) point in the end 16D. Notably, the BSR countermeasure 15D can include two opposing finger-like outwardly-angled tabs, or can include multiple finger-like tabs extending inwardly to form a ring, or can form a soft dome-like protruding ring in an end 16D.

Figure 16:
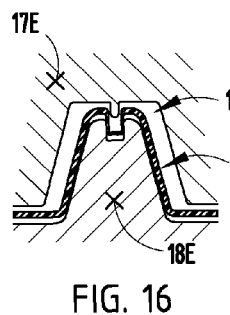
FIGS. 16-19 illustrate crush lobes similar to FIGS. 14-15, respectively, but with alternatively-shaped BSR countermeasures.
Figure 17:
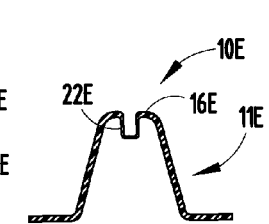
Figure 18:
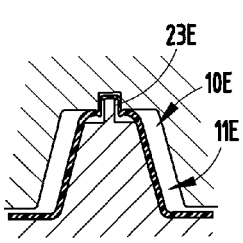
Figure 19:
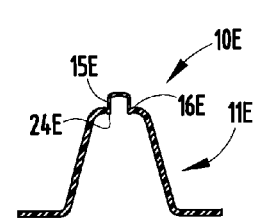
Figure 20:
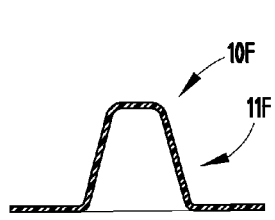
FIGS. 20-22, 23-25, 26-28, and 29-30 are cross-sectional views of modified energy absorbers similar to FIGS. 10-12, respectively, but with alternatively-shaped BSR countermeasures.
Figure 21:
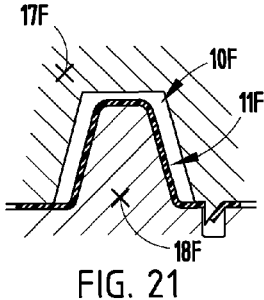
Figure 22:
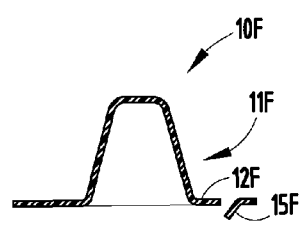
Figure 23:
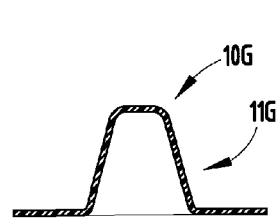
Figure 24:
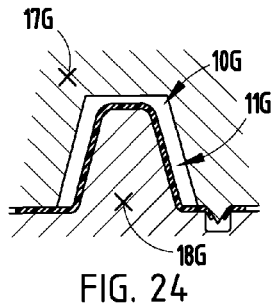
Figure 25:
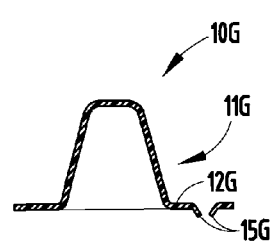

The crush lobe 11E (FIGS. 16-19) includes an inverted cone 22E formed in the outer end 16E and that extends into a cavity of the crush lobe 11E (FIGS. 16-17). In a secondary step (FIG. 18), secondary tooling such as a punch 23E extends upward from within the crush lobe 11E through the cone 22E to form a BSR countermeasure 15E that extends above an end 16E of the crush lobe 11E. By this arrangement, the area 24E of end 16E around the BSR countermeasure 15E is embossed lightly to form a depressed or embossed ring, which affects its columnar strength. Restated, by forming a cone 22E (i.e., a female feature) and then reversing it either mechanically or pneumatically (i.e., using the punch 23E), a soft top feature (i.e., BSR countermeasure 15E) can be achieved that is more compliant than a traditional surface. More generally stated, crush lobe 11E illustrates that a strength of the BSR countermeasure 15E can be affected by a shape and forming process of the supportive area around the BSR countermeasure 15E, as well as by the shape and forming process of the BSR countermeasure itself.

The crush lobes 11F (FIGS. 20-22) and crush lobes 11G (FIGS. 23-25) illustrate BSR countermeasures 15F and 15G, respectively, that are similar to the BSR countermeasures 15C and 15D, but that are located in the base sheet 12F and 12G, respectively (instead of on the end of the crush lobes). Notably, the BSR countermeasures 15F and 15G have a thickness similar to the base sheets 15F and 15G, such that their bending strength is potentially greater than those of BSR countermeasures 15C and 15D. It is contemplated that a BSR countermeasure could also be located in a side of a crush lobe, though typically that is not an area resulting in BSR noise.

Figure 26:
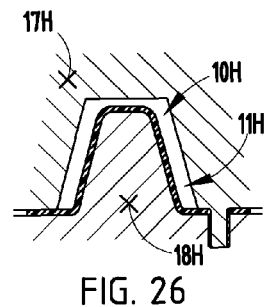
Figure 27:
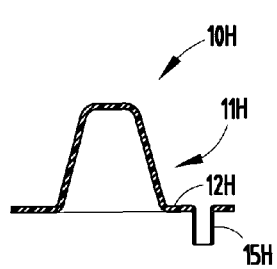
Figure 28:
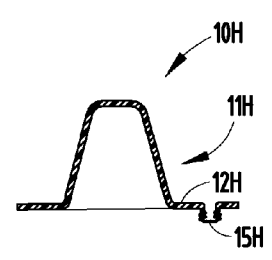

The crush lobe 11H (FIGS. 26-28) has a BSR countermeasure 15H that is similar to the BSR countermeasure 15B in crush lobe 11B (FIGS. 7-9) in that it is sleeve-like or columnar in shape, except in crush lobe 11H, the BSR countermeasure 15H is formed from the base sheet 12H and extends in a direction opposite the crush lobe 11H.

Figure 29:
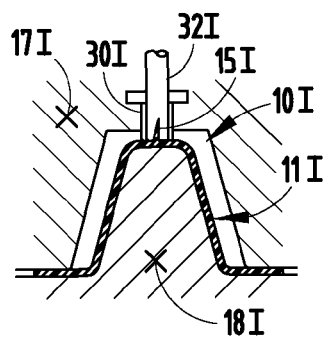
Figure 30:
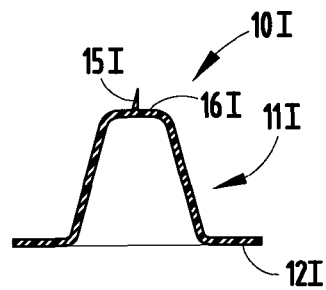

Crush lobe 11I (FIGS. 29-30) includes a BSR countermeasure 15I comprising a thin solid finger of material. The illustrated BSR countermeasure 15I is thinner than the base material (see base sheet 12I) of the initial sheet of plastic prior to thermoforming The illustrated "solid finger" (i.e., BSR countermeasure 15I) is tapered and angled, but it is contemplated that it can be made to be straight walled or tapered along its length, and also it can extend perpendicularly or angled in direction. By selecting a desired shape and direction, one can provide an appropriate degree of flexibility to create a "soft" structure that minimizes BSR noises of assemblies.

The illustrated tooling dies 17I and 18I (FIG. 29) include opposing coining die parts. Specifically, the coining die parts include a sleeve 30I configured to capture a slug of plastic material on a top of the protruding portion of tool 18I. A plunger 32I extends through the sleeve 30I and includes a cavity-defining area in its tip in the shape of the BSR countermeasure 15I. The plunger 32I can be extended via pneumatic or other means, and can be retracted by similar means or by a return spring (not specifically shown). When tools 17I and 18I are moved together, the sleeve 30I captures a slug of heated material in the original polymeric sheet as the energy absorber 10I is being formed. Once engaged, the plunger 32I extends within the sleeve 30I to flow (i.e., "coin") the captured material into the cavity defined in the end of the plunger 32I. This process is sometimes called "coining". Thus, the BSR countermeasure 15I accurately takes on a shape of the cavity area, which is illustrated as being an elongated triangular shaped finger. Notably, the countermeasure 15I is not limited to only the thickness of the end 16I (nor limited to a thickness of the base sheet 12I, depending on where the BSR countermeasure is located). Nor is the BSR countermeasure limited to any final volumetric or dimensional constraints. Instead, a shape and thickness of the BSR countermeasure 15I is only limited by a volume of the material making it up, which must be taken from areas surrounding the BSR countermeasure 15I. Further, it is noted that a ring around the countermeasure 15I (i.e. the region where material is taken from to form the countermeasure 15I) is thinned, thus resulting in softening or reducing an axial and torsional strength of the BSR countermeasure 15I.

Notably, the present invention includes methods and apparatus related to forming the countermeasures into an energy absorber, including forming the countermeasures after the part is thermoformed (such as at an end of the thermoforming line) and/or forming the countermeasure(s) during or after assembly of the energy absorber to a vehicle, and/or forming the countermeasure(s) in the field such as for a field/service fix based on a consumer complaint.

Figure 31:
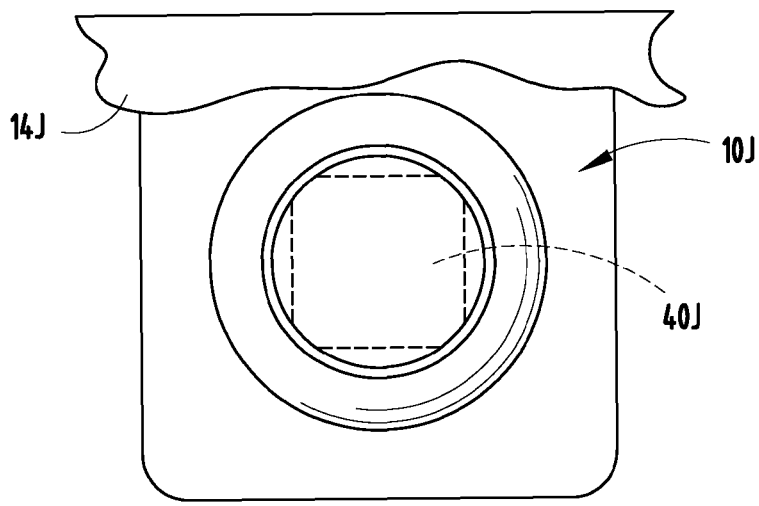
FIGS. 31 and 32 are top and cross-sectional views of an alternative modified energy absorber with another alternative BSR countermeasure, the countermeasure including a magnet.
Figure 32:
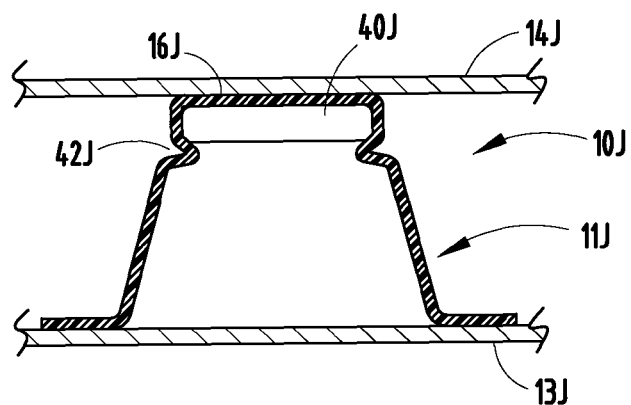

FIGS. 31-32 disclose another energy absorber 10J with a crush lobe 11J where a magnet 40J is positioned in an end 16J of the crush lobe 11J. The magnet 40J is sufficiently strong to provide magnetic attraction through the end wall 16J of the crush lobe 11J. Thus, the magnet 40J serves to magnetically attach to adjacent sheet metal, such as roof structure 14J. This arrangement can be used as an attachment for retaining a part in position, as well as an attachment for retaining a flexible center portion of a part against adjacent sheet metal, while other retainers are used on the part in other locations. Also, the present arrangement can be used to eliminate noise, such as when the sheet metal is close enough to vibrate against the crush lobe to cause a buzz, squeak or rattle noise, thus causing magnet attraction that eliminates any movement and hence eliminates the noise. The illustrated magnet 40J is retained in an end of the crush lobe by deformation of an end of the crush lobe sufficiently to cause a retaining ridge 42J to form around the magnet, thus holding the magnet between the retaining ridge 42J and the end 16J of the crush lobe. The retaining ridge can be formed in different manners. It is contemplated that the magnet can be pressed into the end with sufficient force to temporarily deform the sidewalls of the crush lobe adjacent the end wall, thus essentially forming a retaining ridge by temporarily stretching of the material of the side wall. Also, by positioning a magnet within the crush lobe while the material of the crush lobe is still relatively warm (or hot), the material will shrink onto the magnet, thus frictionally holding the magnet in place and also integrally forming the retaining ridge. Also, the crush lobe can be deformed downwardly to deform the crush lobe into a shape including the ridge. It is also contemplated that the magnet can be friction fit into the crush lobe, such that the ridge is very small or essentially non-existent.

The illustrations above focus on an energy absorber thermoformed from a heated sheet of thermoplastic material. However, it is contemplated that the thermoformed component, as thermoformed from a sheet of heated polymeric material, can be used in other environments. For example, it is often desirable to take up space between two assembled components defining a cavity therebetween, the cavity having a thickness direction and elongated directions generally orthogonal to the thickness direction. In such case, the thermoformed component includes a base sheet and a plurality of thermoformed structures extending from the base sheet. Each thermoformed structure includes at least one side wall extending generally in the thickness direction and includes at least one wall extending generally in the orthogonal directions and including an end wall. The end wall includes an integrally-formed countermeasure of lower standing strength than the thermoformed structures, with the countermeasure extending in a direction generally along the thickness direction and away from the thermoformed structures. By this arrangement, the countermeasure acts to dampen movement that would otherwise cause buzzes, squeaks and/or rattles between the thermoformed component and one of the two assembled components. Thus, the thermoformed component need not be an energy absorber per se, but instead can be any thermoformed part taking up space for whatever reason.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An energy absorber comprising: a base sheet and a plurality of crush lobes extending from the base sheet, each crush lobe including a side wall oriented to crush and collapse to absorb energy when impacted in a first direction and including an end wall, at least one of the base sheet and the end wall of at least one crush lobe including an integrally-formed, hollow countermeasure of lower standing strength than the crush lobes so that the protruding countermeasure acts to dampen movement that would otherwise cause buzzes, squeaks and/or rattles between the energy absorber and an adjacent structure, wherein the countermeasure has a thinner wall thickness than the end wall and the base sheet, and is formed as an elongated protrusion from the same material as the end wall and base sheet, wherein the end wall includes a support section supporting the countermeasure, and wherein the countermeasure is formed from material taken from the support section and flowed into a shape of the countermeasure while the energy absorber material is being formed.

2. The energy absorber defined in claim 1, wherein the countermeasure defines a tapered shape.

3. The energy absorber defined in claim 1, wherein the countermeasure is formed in an associated one of the crush lobes, and extends from the end wall in a direction opposite the associated crush lobe.

4. The energy absorber defined in claim 3, wherein the end wall includes an embossed ring in a support area around the countermeasure.

5. The energy absorber defined in claim 1, wherein the countermeasure is formed in the base sheet.

6. An energy absorber comprising: a base sheet and a plurality of crush lobes extending from the base sheet, each crush lobe including a side wall oriented to crush and collapse to absorb energy when impacted in a first direction and including an end wall, the end wall including an integrally-formed, hollow countermeasure of lower standing strength than the crush lobes, the countermeasure extending in a direction away from the crush lobe, so that the countermeasure acts to dampen movement that would otherwise cause buzzes, squeaks and/or rattles between the energy absorber and an adjacent structure, wherein the countermeasure comprises an elongated strip extending at an angle to the end wall and wherein the countermeasure comprises an elongated tapered member having a varied cross section along its length.

7. The energy absorber defined in claim 6, wherein the countermeasure comprises an elongated strip extending at an angle to the end wall.

8. A thermoformed component thermoformed from a sheet of heated polymeric material for taking up space between two components defining a cavity therebetween, the cavity having a thickness direction and an elongated direction generally orthogonal to the thickness direction, comprising: a base sheet and a plurality of thermoformed structures extending from the base sheet, each thermoformed structure including a side wall extending generally in the thickness direction and including at least one wall extending generally in the elongated direction and including an end wall, the end wall including an integrally-formed, hollow countermeasure of lower standing strength than the thermoformed structures, the countermeasure extending in a direction generally along the thickness direction and away from the thermoformed structures, so that the countermeasure acts to dampen movement that would otherwise cause buzzes, squeaks and/or rattles between the thermoformed component and an environment in which the thermoformed component is deployed.

9. A method comprising steps of: forming an energy absorber with a base sheet and crush lobes extending from the base sheet in a height dimension; and forming an integral, hollow countermeasure of weaker standing strength than the crush lobes and that extends outside of the height dimension from one of the base sheet and the crush lobes.

10. A method comprising steps of: providing a component; forming an energy absorber including crush lobes and at least one hollow countermeasure in an end of one of the crush lobes, the countermeasure being configured to engage or attract the component when placed adjacently, so that buzzes, squeaks, and rattles caused by movement of the energy absorber relative to the component are eliminated; and assembling the energy absorber and the component in adjacent positions relative to each other with the countermeasure preventing movement that would cause a buzz, squeak, or rattle.

\* \* \* \* \*